United States Patent [19]
Donoghue

[11] Patent Number: 5,507,512
[45] Date of Patent: Apr. 16, 1996

[54] RINGS FOR WEIGHTING A BICYCLE WHEEL

[76] Inventor: James P. Donoghue, P.O. Box 272, Medway, Mass. 02053

[21] Appl. No.: 127,161

[22] Filed: Oct. 26, 1993

Related U.S. Application Data

[63] Continuation-in-part of Ser. No. 903,570, Jun. 24, 1992, abandoned.

[51] Int. Cl.$^6$ ....................................................... B62M 1/10
[52] U.S. Cl. ............................................................. 280/217
[58] Field of Search ............................. 280/217; 301/53.5

[56] References Cited

U.S. PATENT DOCUMENTS

| | | | |
|---|---|---|---|
| 2,272,801 | 2/1942 | Hawrylasz | 280/217 |
| 3,787,066 | 1/1974 | Hautier | 280/217 |
| 4,712,806 | 12/1987 | Patrin | 280/217 |

FOREIGN PATENT DOCUMENTS

| | | | |
|---|---|---|---|
| 160923 | 6/1933 | Switzerland | 280/217 |
| 8290 | of 1894 | United Kingdom | 280/217 |

*Primary Examiner*—Mitchell J. Hill
*Attorney, Agent, or Firm*—Thomas Kahrl

[57] ABSTRACT

In bicycle having a frame on which is mounted a front wheel and a rear wheel having a primary axis of rotation, said rear wheel including a rotary drive connected with a multi-speed gear; a wheel frame constructed to support a tire rim connected to said rotary drive, a plurality of spokes for supporting said tire rim on said hub said, and a plurality of spokes, the improvement comprising; a weighting device releasable attached to said rear wheel for adding weight concentrated at said rear wheel's periphery consisting of a matched pair of rings, releasable clip fastener for mounting the weighting device adjacent the periphery of the rear wheel by fastening said rings on the spokes; wherein rotational momentum is increased and concentrated in the rear wheel as said rear wheel is driven by said rotary drive operated by said multi-speed gear by the rider wherein said weighting device acts as a flywheel member adding to said momentum of said cycle.

9 Claims, 4 Drawing Sheets

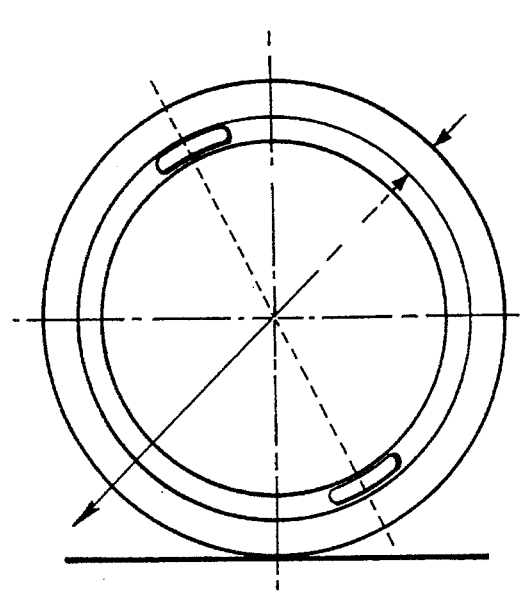 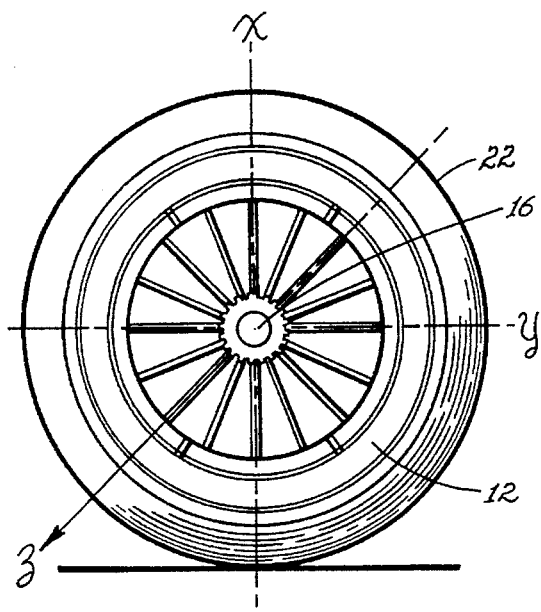
FIG. 4　　　　　FIG. 5
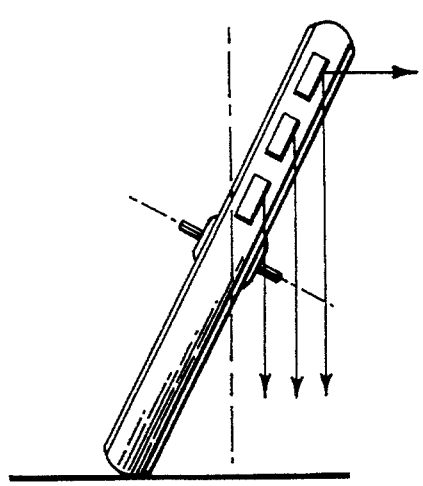 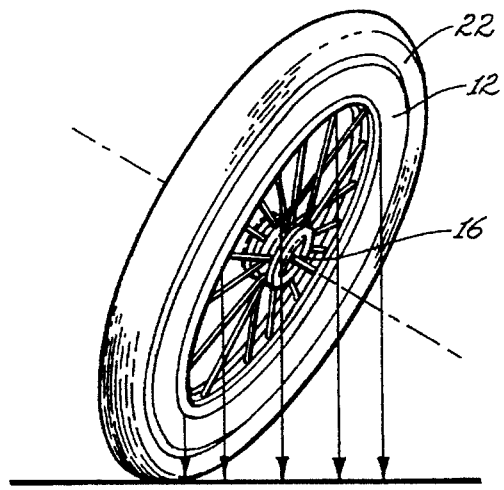
FIG. 6　　　　　FIG. 7

RINGS FOR WEIGHTING A BICYCLE WHEEL

This application is a continuation-in-part of U.S. patent application Ser. No. 07/903,570, filed Jun. 24, 1992, now abandoned which is incorporated herein by reference.

BACKGROUND OF THE INVENTION

It is recognized that increasing momentum of rider-propelled vehicles, such as bicycles, by adding weight to the frame of wheels of a bicycles, is desirable for maintaining speed over sustained distances and providing for reduced pedalling power.

Prior art devices have improved acceleration of such vehicles by the addition of weight, particularly in the area of the wheels,however, due to the complex, three dimensional motion characteristic of bicycles wheels, such added momentum cannot be sustained.

Applicant is aware of prior art devices, namely U.S. Pat. No. 3,237,965 granted to Asano, which provides an aid for accelerating bicycles on which is mounted a weight for aiding the smooth acceleration, by mounting a plurality of weight blocks on a wheel rim, said weight blocks being equally weighted and arranged diametrically opposed or symmetrically on diameter through the center of the wheel. Asano discloses mounting the weight blocks, by inserting them in the annular or circumferential recess of said rim. The height of the weight blocks being so selected so as to not project so much from the recess as to unduly interfere with the tire tube with the weight block so dimensioned that it would not o project over the level of the rim, wherein the weight block is usually elongated in the shape, and is small, i.e. Of course, it is preferable that the block is as small as possible provided it has the desired weight—of 100–150 grams each, and is of 10–15 cm. in length, 1–1.5 cm. in width and 0.9–1.1 cm. in height. However, Asano's Azimuthal Moment of Inertia is not smooth in 3 dimensions.

DEFINITION OF GYROSCOPIC EFFECT

The consequence of a wheel with a slow speed of rotation and a small radius of gyration, is less gyroscopic action. The consequence of a wheel with rotational acceleration and a weighted radius of gyration is increased gyroscopic action in the X, Y & Z axes as shown in FIG. 4, reducing vibration period, frequency and amplitude motion. When balanced by a rider, a bicycle has a straight path. When tilting, the bicycle produces a rate of production of angular momentum about a downward axis and there being initially no couple about that axis, the wheel (while turning) begins to turn round in an azimuthal direction to neutralize the angular momentum produced. The gyrostatic couple of a bicycle with two wheels when the bicycle is passing round a curve is $N*I*v*v/R*r$, where I is the moment of inertia of the wheel, r is the radius of the wheel, N is the number of wheels, v is the velocity of the bicycle, and R is the radius of the curve.

Asano's accelerator aid is not an aid for smoothing the acceleration thereof in the Z axis. As soon as the Z axis is introduced, as on the wheel of a bicycle, in FIG. 5, the applicant's momentum conservation device is now operating in the X,Y,& Z axes and operates in the world of relativistic dynamics, where in the case of the Asano device, the opposing blocks are equivalent to the dynamics of motion of an un-symmetrical top with each block having a azimuthal angle operating as a spherical pendulum in the X,Y, and Z axes. Bravais' theorem by elliptic functions and Lame's equations applied to this dynamic condition describe the vibratory motion of the pendulum type device.

In the Asano disclosure, the twisting and turning of the wheel with independent blocks of mass, provides non-uniform and inconsistent Z axis acceleration on the Z axis of azimuthal motion. It is the straight line azimuthal motion in the Z axis directions which increase the vibratory motion in the pendulum type device.

It is this complex interrelation that makes the behavior of the momentum conservation wheel so intuitively unpredictable and different from what one might expect. In the dynamic equations, the torque about each axis is related to all three angular accelerations, the coefficients being three values of rotational inertia and three quantities called products of inertia.

The kinematic description requires specification of multiple components of position, angular velocity, angular acceleration and acceleration of a center of mass as well as the precession and nutation of the wheel. The complex forces which come in to play in the operation of a bicycle due to the three dimensional nature of its operation include the following; Rotational Precession and Nutation.

Precession, a comparatively slow gyration of the rotation axis of a spinning body about another line intersecting it so as to describe a cone caused by the application of a torque tending to change the direction of the rotation axis and is another one of the many causes of the wheel's vibratory motion, acting as an impulse which negatively effects the conservation of rotation momentum in a wheel. Precession is at work when a top rises up on it's axis of rotation, and a top cannot rise if it is too heavy, i.e.: the kinetic energy of precession must exceed (in general) the increase of potential energy.

Nutation, an oscillatory movement of the axis (axes) of a rotating body, or wobble; is another one of the many causes of the wheel's vibratory motion, acting as an impulse which negatively effects the conservation of rotation momentum in a wheel.

"Kinematic Power Transmission Device;" Analytic Dynamics of a moving frame containing a flywheel The general description of the kinematics and dynamics of a rigid body in three dimensional motion is very complex mathematically and is usually looked at from the perspective of analytical dynamics and the conservation of angular momentum both theoretical and in practice.

Using a flywheel to maintain machine speed is an old technique for meeting varying power demands (Work). The flywheel must supply the deficient power (Torque) at certain points of a varying load cycle. Flywheel's are simple and effective devices. In the transmission of mechanical power, typically one introduces a device to change the rotational speed and correspondingly changes the torque with gearing, but in the case of the kinematic power transmission device, for example the momentum conservation device in combination with a bicycle wheel, mechanical geared power is transmitted into the angular momentum of the ring and is then available for rotational work of the tire without gearing.

Flywheels and flywheel dynamics pertain to those devices which consist of a hub bearing 1, hub 2, spoke 3, and rim 4 and in principle a flywheel is always dynamically unbalanced due to the fluctuating bearing action. Increasing the moment arm (spoke) in a perpendicular distance from the axis of rotation (center of the wheel) makes it easier and easier to rotate the wheel about its center axis of rotation.

Stated another way, unbalanced torque can be viewed in a rotor (momentum conservation wheel or any other flywheel device), if said device being a rigid body, with the origin of fluctuating forces coming from the center of mass not lying on the primary axis of rotation, the rotating body will possess constantly changing linear momentum in reaction to each fluctuating force. Said unbalanced torque originates as soon as the wheel begins to rotate, due to the imbalance of all rotor devices. Secondly, even if the centroid of rotation lies on the primary axis of rotation, there would still be fluctuating forces (unbalanced torque's) due to the wheel bearings.

Accordingly it is an object of this invention, to achieve a reduction of the imbalanced rotor device (momentum conservation wheel) more than the prior art. The dynamics of a moving frame containing a flywheel, in practice, can be viewed with a frame of rectangular axes, $O(x,y,z)$ from an origin O which is in motion with speeds v1, v2, v3 along the instantaneous positions of these axes, and let the frame have angular speeds w1, w2, w3 about these positions. A straight line OP is at the instant inclined to the axes at angles the cosines of which are l, m, n.

These cosines are the coordinates of a point A on OP at unit distance from O. Then, apart from the motion of O, the components of the velocity of a in space, with respect to the fixed axes with which $O(x,y,z)$ coincide are, $l=m*w3+n*w2$, $m=n*w1+l*w3$, $n=l*w2+m*w1$. Now take a fixed origin O', and let axes $O'(x,y,z)$ be drawn from this origin which move so as always to be parallel to $O(x,y,z)$. Let m1, m2, m3 denote components of momentum of a body taken parallel to the axes $O'(x,y,z)$ in their instantaneous position. The momentum resolved in the direction OP is $P=1*m1+m*m2+n*m3$. If OP is fixed in direction, we have $^P/^t=1*(m1-w3*m2+w2*m3)+m*(m2-l*m3+w3*m1)+n*(m3-w2*m1+w1*m 2)$, since the total time rates of variation of l,m,n are zero, according to $l=m*w3+n*w2$, $m=n*w1+l*w3$, $n=l*w2+m*w1$. Thus if X,Y,Z be the components of applied force along the axes, the equations of linear momentum are; $m1-w3*m2+w2*m3=X$, $m2-w1*m3+w3*m1=Y$, $m3-w2*m1+w1*m2=Z$.

These equations still do not form the equation s of angular momentum of the momentum conservation wheel, but begin to show how linear momentum can act in a theoretical 3 dimensional plane. The main purpose of these equations is to show how in a theoretical aspect, angular momentum of a rotor device (momentum conservation wheel) is inherently unbalanced, but the instantaneous position of this device is has more primary directional momentum than the prior art. This device, as well as all prior art, have ellipsoid oscillating (Nutational) vibratory motion which can be expressed in Elliptical integral functional mathematics with it's own frequencies, and periods which must be calculated both in the longitudinal and transverse periods. It is all the above stated mathematics which must be analyzed in looking at the differences between the momentum conservation wheel and the prior art devices.

The Asano device as well as the Momentum Conservation device of the invention are so-called "Kinematic Power Transmission Devices". They provide KINEMATIC POWER TRANSMISSION to the tire of a wheel. Both devices receive energy impulses (Torque), temporarily store energy (Momentum) at the rim and transmit energy (Power) to the tire of a wheel. Varying power demands (Work) are met using Kinematic power transmission devices which act as renewable momentum reserves storing energy from fluctuating power sources (Impulses) or stated differently, the change in momentum is equal to the impulse.

In two dimensions, the kinetic energy of a rigid body in two dimensional motion equals the kinetic energy of a particle containing the whole mass and moving with the center of mass, plus the rotational kinetic energy computed as if the body were in pure rotation about the center of mass. It is these two dimensional motions which the Kinematic Power (E.K) Transmission Device. (Momentum conservation wheel) can optimize for a wheel and combination vehicle and is written with the equation; $E.K.=½*m*vc*vc+½*Ic*w*w$; where vc is the velocity of the center of mass, and Ic is the rotational inertia about the axis through the center of the mass and w is the rotational velocity of the mass. In three dimensional analysis of the Kinematic Power Transmission Device, it is the third dimensional motion which should be stabilized to maximize the two dimensional motion stated above and is accomplished with this device via the well-known gyroscopic effect. This device with its gyroscopic effect reduces the simple harmonic motions throughout the wheel bearings, hub, spokes, rim and tire of a wheel.

These "Kinematic Power Transmission Devices" are not pure flywheel devices due to the frictional force of a surface which aids linear acceleration of the total center of mass. This moment of the frictional force about the momentum loci has an effect on angular acceleration. Frictional slippage ($F-f'=ma$, where total Force F is reduced by the frictional force f') on a surface is one dynamic behavior not found in flywheel analytic dynamics, as well as angular acceleration in the Z axis and not contended with, and therefore for the purpose of this discussion make flywheel analytic dynamics a subset to Kinematic Power Transmission Device analytic dynamics. Frictional Slippage on a surface play a significant factor in the analytic dynamics of a Kinematic Power Transmission Device. One example being the storage of momentum when the wheel and combination Kinematic Power Transmission Device is going down a hill storing energy, while another example being the Kinematic Power Transmission Device two dimensional balance of angular momentum on a reduced friction surface, or a third example being wind resistance and it's external forces to the Kinematic Power Transmission Device X, Y axes, two dimensional conservation of angular momentum.

Flywheels attempt to have a fixed axis with a principle axis of moment of inertia. These Kinetic Power Transmission devices do not attempt to have a fixed axis in any dimension. The analytic dynamic equation of Euler deal with motion of moving axes and the principle axes of momental ellipsoid, which move with the device.

Insignificant Weighting & Resulting Gyroscopic Effect

The weights described in the Asano prior art device are not heavy enough to significantly effect two dimensional angular momentum motion of the wheel or produce significant gyroscopic effect to counter act the Z axis (third dimensional) of angular momentum motion of the bicycle wheel. The gyroscopic effect resulting from a wheel mounted to spin rapidly about an axis and also free to rotate about one or both of two axes perpendicular to each other and to the axis of spin so that a rotation of one of the two mutually perpendicular axes results from application of torque to the other, when the wheel is spinning, and so that the entire apparatus offers considerable opposition depending on the angular momentum to any torque that would change the direction of the axis of spin.

The larger the angular moment of momentum, the larger the gyroscopic effect for a given velocity and mass of the wheel, and the more resistant the wheel is to change of its primary axis or flotation, and the more stable the wheel becomes at maintaining its primary axis of rotation written $\&=T/I$, meaning the larger the moment of inertia, the less there will be a change in acceleration for a given force over time, the more conservation of momentum will occur.

Uniform Weighting

The angular momentum loci of the block weights of the Asano prior art device in combination with wheel in straight line motion is not confined to the center of the wheel unless all masses place the angular momentum into a single loci. By attachment of these weight blocks on a wheel, both the moment of inertia and rotary moment of the wheel is increased so that the bicycle or auto-bicycle, when driven by a given force, is more smoothly accelerated and driven. This may be theoretically explained as follows:

Referring to FIGS. 3 and 4, the letter "r" indicates the radius of the rim 3 and the letter "d" indicates the radial thickness of the tire 4. It is seen that the contribution from the rotational moment of inertial of the wheel due to the weight blocks is 2*m*r*r where m is the total mass of the weight blocks. The weight blocks therefore act to stabilize the acceleration of the bicycle by the well known flywheel effect. Consequently, in accordance with Newton's first law, the bicycle provided with this wheel would increase by 2*m*r*r in the resistance to changes in external forces (e.g. wind, frictional resistance, rate of climb, etc.)

2*m*r*r Formula

The 2*m*r*r moment of inertia formula is only partially true when considering two dimension "flywheel" physics. Flywheels themselves have unbalanced dynamic gimbal torque properties which make the resistance to change less than the stated 2*m*r*r figure for the accelerating aid described in the Asano patent.

This formula is for straight line moment of inertia and gives us the theoretical two dimensional rotational moment of inertia.

| Mathematical Symbols Used: | | |
| --- | --- | --- |
| Change Symbol | ^ | Multiplication Symbol * |
| Alpha Symbol | & | Summation Symbol { |
| Average | ~ | |
| | | |
| Additional Formulas | | |
| Quantity | Rectilinear | |
| Equivalent | Motion | Rotational Motion |
| | | |
| Displacement | s | O (angular) |
| Velocity | v = ^s/^t | w = ^w/^t (angular) |
| Acceleration | a = ^v/^t | & = ^w/^t (angular) |
| Inertia | m (mass) | I (rotational inertia) |
| Force, Torque | F | L (torque) |
| Newton's Principle | F = m*a | L = I*& |
| Element of Work | F^s | L^O |
| Kinetic Energy | ½*m*v*v | ½*I*w*w |
| Power | F*v | L*w |
| Momentum (P) | m*v | I*w (angular) |
| Impulse | ~F^t | ~L ^t (angular) |
| Average Power (~P) | ^v/^t | ^w/^t |
| Radius of gyration (k) | | I = m*k*k |

Momenta = Plural of momentum - can be used when talking about 3 dimensional momentums.

Two dimensional motion is a special case of analytic dynamics. The kinematics and dynamic description of two dimensional motion of a rigid body that is not constrained to rotate about a fixed axis, such as a wheel on a bicycle, is an important type of motion but is not difficult to understand. In two dimensional motion, each particle of the body moves in a plane, parallel to the X,Y plane, i.e.: each particle has X and Y components of velocity as found in a theoretical rolling wheel. The motion can be described as a translation of the center of mass, plus a rotation about an axis through the center of mass and perpendicular to the X,Y plane. The angular velocity of the body is defined by the equation: w=lim^t–>0(^O/^t) while the angular acceleration is defined by the equation: a=lim^t–>0(^w/^t).

When the clockwise angular displacement O is 2 *22/ 7(TT=PIE), the linear displacement of the center in the X direction is 2*TT*r, hence the rolling wheel X=R*O, ^X/^t=R *^O/^y, or v=R*w where v is the X component of the velocity of the center of the wheel and w is the angular velocity, or ^v/^t=R*^w/^t or &=R*& where & is the X component of the acceleration of the center and & is the angular acceleration.

Accordingly, it is desirable to provide for a new and improved acceleration of such bicycles by the addition of weighted rings, particularly; parallel with the axis of the wheel of a bicycle to stabilize the complex, three dimensional motion characteristic of bicycles wheels, for conserving angular momentum for sustained acceleration and to provide for improved ease of operation with no additional part other than rings and clips, which are easy to add and remove and which overcomes at least some of the disadvantages of prior art.

Therefore, it is an object of this invention to provide an improved bicycle wheel which is simple and inexpensive and which is effective to aid in accelerating the bicycle without any additional modification such as of driving mechanism, power transmission mechanism or engine (in case of auto-bicycle).

Summary of the Invention

The invention relates to weighted rings for mounting on a bicycle wheel for conserving angular momentum of the wheel when in motion by controlling the vibratory motion of the wheel which would otherwise have a negative effect the conservation of angular momentum of the wheel, and to a method of weighting bicycle wheels to reduce vibratory motion and increase momentum and to conserve angular momentum utilizing the well-known gyroscopic effect.

In particular the invention concerns increasing the momentum of at least one wheel having a spoke frame of a multi-speed, rider-propelled bicycle, typically a 10–20 speed bicycle, for storing energy by mounting a pair of weighted rings constructed to be uniformly weighted of substantial weight on the spoke frame adjacent the wheeled rim, and to stabilizing rotation of the wheel to reduce vibratory motion normally caused by the effect of external forces, precession forces, and nutational forces. The invention particularly concerns stabilizing the rotation of the wheel by controlling deflection of the wheel from the plane of the axis of rotation of said wheel, thereby conserving angular momentum of the wheel and combination bicycle. More particularly, this invention is directed to uniform accumulation of motion of a mass added on a wheel-spoke frame, positioned immediately inwardly and adjacent the rim of the wheel such that a substantial mass is arranged in the outermost circumferential spaced from the wheels hub, and extending a substantial distance inwardly along in co-planar relationship with the axis of the wheel. The optimal mass preferably is greater than 5% of the combined weight of the bicycle, and the weight of the rider. In any event, the weight of each ring is at least five pounds.

The momentum conservation device includes two weighted, continuous, momentum rings positioned on a wheel, providing uniform distribution of mass in a ring configuration, to act to smooth acceleration in the X,Y, & Z axes directions and maintain the angular acceleration on the primary axis of rotation. The momentum rings typically are constructed in pairs to be mounted on a wheel having a central hub mounted on an axle for supporting the wheel on a vehicular frame, such as a bicycle frame. Typically, the wheel includes a circular rim attached to the outer circumference of a circular frame including a plurality of spokes extending outward from the hub toward the rim containing a tire, typically an inflatable tire on the rim member. The circular frame extends between the hub and the rim, having a first lateral side and a second lateral side, and includes a plurality of spokes. The rim is adapted for receiving an inner tube of a tire, having a rim base provided for fastening or anchoring the spokes and it is configured with a first lateral side and a second lateral side. As provided in the preferred embodiment, the circular frame comprises a series of spokes, typically ranging from 3–36 in number, connected at one end to the hub, and connected at the other end to the rim base of the rim.

In the preferred embodiment, the momentum rings are substantially weighted for adding weight to the wheel at a selected position adjacent and immediately inward of the rim, said weight being at least five(5) pounds for each momentum ring, combined to generate momentum for stabilizing the operation of the wheel and combination bicycle, for reducing vibratory motion of the wheel and for storing energy to enable the rider to maintain speed over an uneven terrain, with less effort, and for conserving angular momentum by stabilizing the wheel in a straight path, straight Y axis plane, and for controlling deflection of the bicycle from that path on the Z axis. Typically, the use of momentum rings mounted adjacent the rims of the bicycle wheels on spokes generate sufficient momentum requiring less pedaling effort and permits for maintaining speed more easily when riding up an inclined terrain and also with the fly-wheel effect is effective for storing energy when riding downhill. It is important that the momentum rings be substantially weighted, be positioned in pairs on opposite sides of the bicycle wheel in coplanar relationship with the central axis of the wheel and that they extend inwardly a substantial distance of at least 1" perpendicular to the axis of the wheel such that during rotation the weighted rings serve to maintain the rotating wheel in a straight path in 3 dimensions and prevent deflections from the plane of the primary axis of rotation, thereby preventing loss of momentum by conserving angular momentum according to Newton's Second Law for change in momentum.

In the preferred embodiment, the momentum rings are adapted to be applied directly to conventional "cross" bicycles having multi-speed gearing, requiring no additional apparatus other than lightweight clips for mounting the rings at the selected outer radial position on the spokes of the frame spaced from the hub in co-planar relationship with the central axis of the wheel.

As installed, the selection of the outer frame position for the momentum rings is beneficial to increasing the angular momentum of the wheel during rotation. Application of substantial weight to the wheel should be as close as possible to the rim of the wheel, yet should extend a substantial distance from the rim inwardly along the axis of the plane for stabilizing the rotation of the wheel in the axis of rotation. Potential momentum of the bicycle is effectively increased by weight distribution along the circumference of the wheel so as to create momentum which will equalize the rotational speed of the wheel where the wheel is powered by pedaling. The momentum rings are typically mounted on the rear wheel of the bicycle to capture a portion of the energy generated during the "power stroke" of a reciprocating movement, and release a portion of the captured energy during the "recovery stroke" and thus utilize this captured kinetic energy in the rings to minimize the speed variation of the vehicle.

Particularly, the momentum rings consist of a matched pair of weighted ring elements for the rear wheel of the bicycle. More particularly described as a first ring element characterized by a central through hole surrounded by an inner annular edge, and having a ring member having a thickness of ⅜" and a distance between the inner diameter and the outer diameter of at least 1". Positioned on the outer ring surface is an annular groove extending inwardly and orthogonical relationship with the plane of the ring, and is adapted to associate with clips for fastening a first ring to the first lateral side of the wheel ring and a second ring to the second lateral side of the wheel frame. The second ring element is a mirror image of the first.

Fastening of a pair of momentum rings to a bicycle wheel is accomplished by providing a plurality of lightweight clips having two jaws biased inwardly for clamping the first and second rings to opposite sides of the wheel frame. The spokes of the wheel provides spaces for the clips to be inserted and are constructed with an outward spring biased action which tends to act against the inwardly directed action of the clipped rings being compressed together by the clips containing a biasing connector to join the jaws permitting movement of the jaw means between an open position and a closed clamping position, and to provide an inwardly biasing action.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 4 is a side view of a prior art bicycle wheel.

FIG. 5 is a side view of the bicycle wheel of the invention of FIG. 1 showing axes X,Y, and Z.

FIG. 6 is an end view of FIG. 4.

FIG. 7 is a tilted view of FIG. 5.

DETAILED DESCRIPTION OF THE PREFERRED EMBODIMENT

Figure 8:
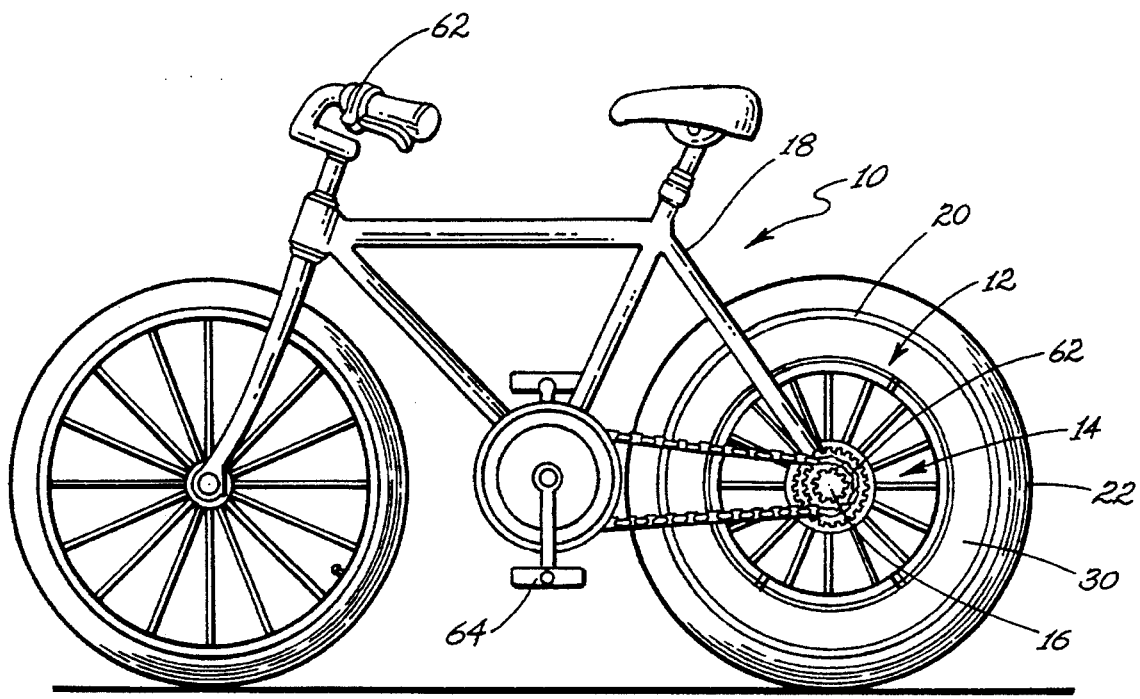
FIG. 8 is a side view of a momentum conservation device installed on the rear wheels.

Referring to the drawing, more particularly FIG. 8, there is schematically shown a conventional bicycle 10 having a momentum conservation device 12 mounted a rear wheel 14. Said wheel as is shown in Fig.5 has three dimensional axes X, Y and Z having an axis of rotation in the plane containing the X and Y axes. Said wheel includes a centrally disposed hub 16 for mounting said wheel on frame 18 of said bicycle; a circular rim 20 for mounting a bicycle tire 22. A wheel frame 28 of circular construction includes spokes 24 for supporting the circular rim 20 on the hub 16 consisting a plurality of spokes extending radially outward from said hub to said circular rim having a first and second lateral side.

Figure 1:
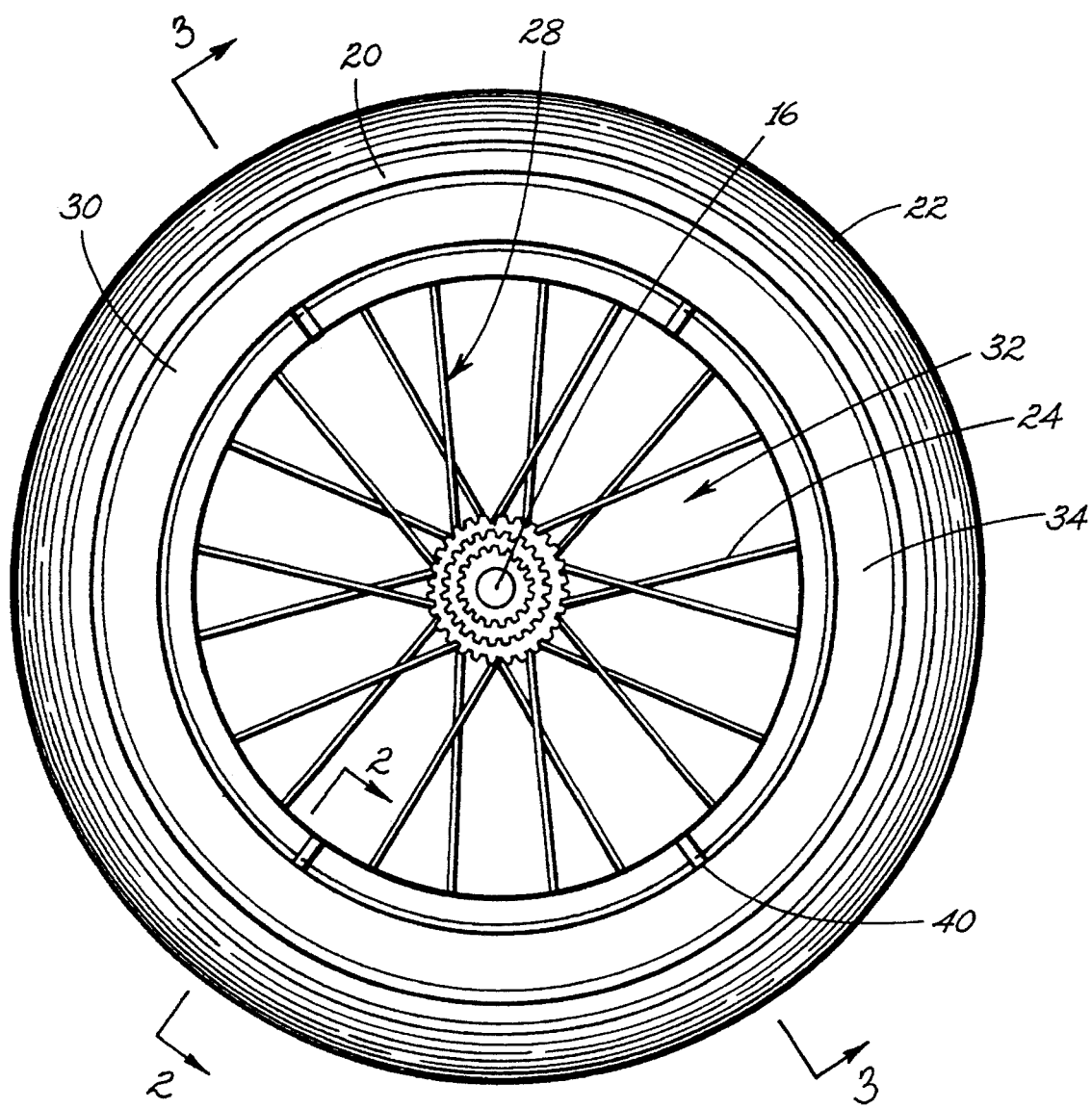
FIG. 1 is a side view of a momentum conservation ring of the invention mounted on a wheel.

In the preferred embodiment the momentum conservation device 12 is configured with weighted metal rings 30, comprising momentum rings for conserving angular momentum of the wheel in motion by controlling the vibratory motion of said wheel causing deflection of the wheel from the axis of rotation defined by the X and Y and Z. Said rings are of annular construction each ring having a weight of at least five pounds wherein as is shown in FIGS. 1, 2 & 3 the first ring is mounted on the first lateral side of the spokes and the second ring is mounted on the second lateral side of the spoke, each ring having a through hole 32 and an annular surface 34, wherein the annular member extends coplanar and inwardly from the rim along the axis of rotation toward the hub, a distance of at least 1".

In this embodiment, fastening of the momentum rings to the wheel is accomplished by a plurality of clips 36 adapted for fastening the first and second rings on opposite sides of the spokes. As is shown in FIGS. 2 & 3 the clips 36 are adapted for engaging the inner recess 40 of rings 30 adjacent consisting of the edge of the through hole, said clip means comprising a plurality of biased clips adapted to clamp the first ring 30 to the second ring 30 adjacent the circular rim wherein the spokes provide a support frame for said rings. The wheel structure may be any conventional one and therefore is not restricted to the particular type shown.

Figure 2:
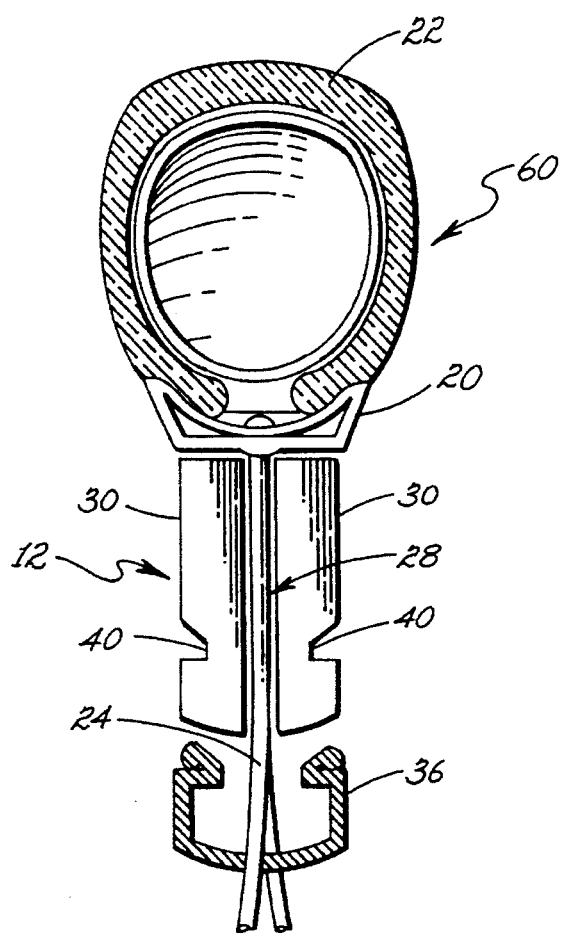
FIG. 2 is a cross-sectional view of the momentum conservation ring of FIG. 1 along lines 2—2 showing the clip disengaged from a pair of rings, said view being a partially enlarged view.
Figure 3:
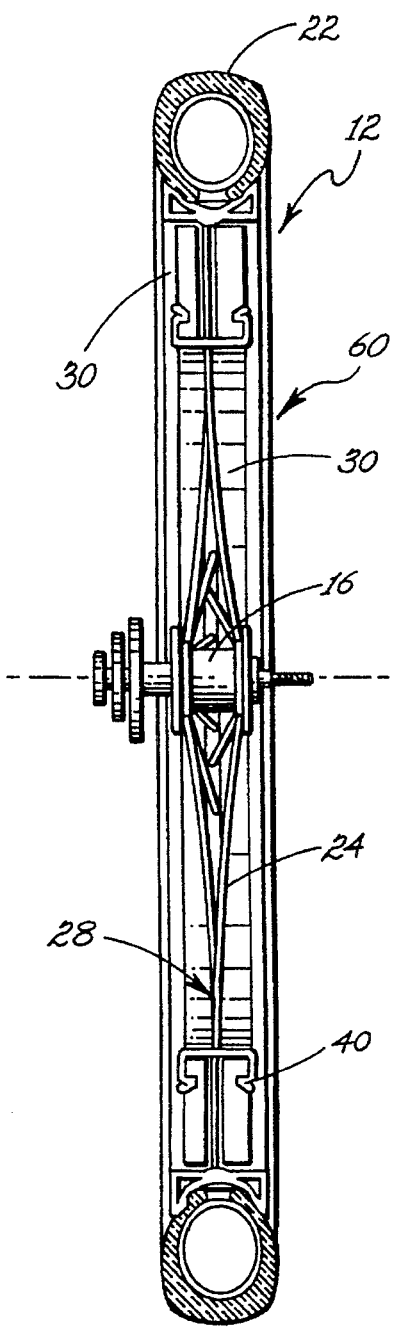
FIG. 3 is a cross-sectional view of the momentum conservation device of FIG. 1 taken along lines 3—3.

As is shown in FIGS. 2 & 3 an important and essential feature of the invention is in the provision of spaced ring weights arranged co-planarly, spaced apart and symmetrical in respect of the center of the wheel as shown. The preferred dimensions of the rings are as follows: ⅜" thick, 1" between I.D. and O.D. and 5 pounds each in weighted, constructed of metallic material.

As is shown in FIG. 7, the momentum rings are installed on the rear wheel, 60, alone; and said rear wheel includes multiple gears 62, driven by the bicycle pedals 64.

What is claimed is:

1. In bicycle having a frame on which is mounted a front wheel and a rear wheel each wheel having a primary axis of rotation, said rear wheel including:

i) a hub for mounting said rear wheel on said frame;

ii) a rotary drive connected with a multi-speed gear in said hub;

iii) a tire mounted on a tire rim; and iv) a wheel frame arranged to extend radially outward from said hub to said tire rim having a first and second lateral side and connected to said rotary drive; the improvement comprising:

a) weighting means for adding weight to said bicycle concentrated at said rear wheel releasibly mounted on said rear wheel comprising a matched pair of rings comprising;

i) a first ring having a continuous mass, an outer circumference and an inner circumference; and ii) a second ring having continuous mass, an outer circumference and an inner circumference; each of said rings having an annular surface extending between said outer circumference and an inner circumference for providing for uniform weight distribution around said rear wheel wherein said first ring is mounted on a first lateral side of said wheel frame and said second ring is mounted on a second lateral side of said wheel frame; and b) releasable clip means for mounting the weighting device on said wheel frame arranged along the primary axis rotation of the rear wheel positioned adjacent the periphery of said rear wheel whereby the first and second rings are releasibly fastened on the first and second lateral sides of said wheel frame.

2. The bicycle claim 1 wherein as said rear wheel is driven by said rotary drive operated by said multi-speed gear, the weighting means acts as a flywheel for maintaining speed of the bicycle.

3. The bicycle of claim 1 wherein said wheel frame comprises a plurality of spokes aligned with said primary axis of rotation effective for supporting said weighting means.

4. The bicycle of claim 1 wherein the annular surface is characterized by an annular recess positioned coaxially with said inner circumference of each of said rings; said recess adapted to associate with said clip means for fastening said rings to said rear wheel.

5. The bicycle of claim 1, wherein said first ring and said second ring are positioned on said rear wheel on opposite sides of said wheel frame having a co-planar relationship with said primary axis of rotation of said rear wheel.

6. The bicycle of claim 1 wherein said clip means comprise a plurality of lightweight, quick-disconnect clips each clip comprising:

a) a biasing member connecting a first clip member and a second clip member, said clip members adapted to associate with said recess of said first and second rings, wherein said biasing means is constructed for permitting movement of said clip means between an open position and a closed, clamping position, said clip means consisting of minimal light-weight structure having a minimum weight and structure without interfering with said continuous annular mass of said weighting means.

7. The bicycle of claim 1 wherein said first ring comprises a heavily weighted annular disc having thickness of at least ⅜" and having a width of at least 1" having a weight of at least 5 pounds and said second ring is a mirror image of the first ring and comprises a heavily weighted annular disc having a thickness of at least ⅜" and having a width of at least 1" having a weight of at least 5 pounds.

8. The bicycle of claim 1 wherein said clip means comprises lightweight clips arranged in pairs being placed in diametrically opposed positions on said first and second rings to maintain uniform weight distribution around said rear wheel.

9. A combination of a set of weighted rings mounted on a wheel of a rider-propelled bicycle comprising;

a) a rear wheel having an vertical axis of rotation comprising:

i) a hub for mounting said wheel on said bicycle ii) a circular tire rim;

iii) spokes for supporting said circular tire rim on said hub comprising a plurality of spokes having a first and second lateral side extending radially outward from said hub to said circular tire rim;

b) a weighting device comprising two metal rings each having a weight of at least 5 pounds comprising a first ring and a second ring Wherein said first ring is mounted on said first lateral side of said spokes and said second ring is mounted on said second lateral side of said spokes, each ring having an annular member wherein said annular member extends inwardly from said tire rim along said axis of rotation toward said hub, a distance of at least 1"; and c) clip means for fastening said bicycle device to said rear wheel comprising a plurality of biased clips.

\* \* \* \* \*